United States Patent
Sendrovitz

(10) Patent No.: US 7,176,928 B1
(45) Date of Patent: Feb. 13, 2007

(54) RECOVERY OF A SERIAL BITSTREAM CLOCK AT A RECEIVER IN SERIAL-OVER-PACKET TRANSPORT

(75) Inventor: Ran Sendrovitz, San Ramon, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 231 days.

(21) Appl. No.: 11/011,227

(22) Filed: Dec. 13, 2004

(51) Int. Cl.
*G06T 15/00* (2006.01)
(52) U.S. Cl. .................. 345/534; 345/520; 370/395.62
(58) Field of Classification Search ................ 345/520; 370/229, 230, 235, 236, 516, 395.62
See application file for complete search history.

(56) References Cited

U.S. PATENT DOCUMENTS

| | | | | |
|---|---|---|---|---|
| 5,699,391 A | * | 12/1997 | Mazzurco et al. | .......... 375/372 |
| 6,167,048 A | * | 12/2000 | Law et al. | ............. 370/395.62 |
| 6,999,480 B2 | * | 2/2006 | Subrahmanyan et al. | ... 370/516 |

* cited by examiner

*Primary Examiner*—Phu K. Nguyen
(74) *Attorney, Agent, or Firm*—Townsend and Townsend and Crew LLP

(57) ABSTRACT

A receiver for recovering a serial clock of a transmitter is provided. The receiver comprises a buffer configured to store packets received from the transmitter. The packets may be sent through a packet switched network that may incur packet delay during transmission through the network. A memory controller is configured to determine a fill level of the buffer. A frequency generator is configured to generate a clock frequency, where the frequency is used to determine when to read packets from the buffer. A frequency controller is configured to instantaneously adjust the frequency of the frequency generator based on an algorithm that determines the clock frequency based on the fill level of the buffer. Accordingly, by adjusting the frequency outputted by the frequency generator, the frequency controller is able to recover the serial clock of the transmitter.

42 Claims, 11 Drawing Sheets

RECOVERY OF A SERIAL BITSTREAM CLOCK AT A RECEIVER IN SERIAL-OVER-PACKET TRANSPORT

COPYRIGHT

A portion of the disclosure of this patent document contains material that is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention generally relates to telecommunications and more specifically to recovering a clock of a transmitter at a receiver.

In a packet switched network (PSN), a transmitter node may receive a serial bitstream from a local source, packetize it (i.e., chop the continuous stream into groups of bits), add packet headers/trailers, and send the packets across a packet switched network. The packets are received at a receiver node. The receiver node stores the incoming packets (or the packets' payload) in a buffer, and then reads the data of the payload out and plays a serial stream of the data locally to an attached serial stream receiver. At the sender end, the serial bitstream is played at a fixed rate of X bits per second (Mbps). The packets do not carry the timing of the serial bitstream. While traversing the PSN, jitter or packet delay variation (PDV) may be introduced to the packet stream. Accordingly, the packets may arrive at the receiver node in varying intervals.

The information in the packets is then arranged into the serial bitstream and played out to the local serial receiver. In playing out the serial bitstream, a clock needs to be used to play the serial bitstream at a certain fixed rate. This clock should be the same rate as the clock used to send the packets at the sender end. The fixed rate, however, is not carried in the packets.

Accordingly, techniques for recovering a clock used at the sender's end are desired.

BRIEF SUMMARY OF THE INVENTION

Embodiments of the present invention generally relate to a receiver for recovering a serial clock of a transmitter. The receiver comprises a buffer configured to store packets received from the transmitter. The packets may be sent through a packet switched network that may incur packet delay during transmission through the network. A memory controller is configured to determine a fill level of the buffer. A frequency generator is configured to generate a clock frequency, where the frequency is used to determine when to read packets from the buffer. A frequency controller is configured to instantaneously adjust the frequency of the frequency generator based on an algorithm that determines the clock frequency based on the fill level of the buffer. Accordingly, by adjusting the frequency outputted by the frequency generator, the frequency controller is able to recover the serial clock of the transmitter.

In one embodiment, a receiver for recovering a serial clock of a transmitter used in sending packets from the transmitter is provided where packet delay in sending the packets from the transmitter to the receiver occurs. The receiver comprises: a buffer configured to store packets received from the transmitter; a controller configured to determine a fill level of the buffer; a frequency generator configured to generate a clock frequency, the clock frequency used to determine when to read packets from the buffer; a frequency controller configured to instantaneously adjust the clock frequency of the frequency generator based on an algorithm that determines the clock frequency based on the fill level of the buffer.

In another embodiment, a method for determining a clock frequency of a transmitter used in sending packets from the transmitter is provided where packet delay in sending the packets from the transmitter to the receiver occurs. The method comprises: receiving a plurality of packets at the receiver; storing the plurality of packets in a buffer; monitoring a fill level of the buffer for a time period; providing a counter; during the time period, incrementing or decrementing a counter based on the fill level of the buffer; at an end of the time period, determining if a frequency of the recovered serial clock should be increased or decreased based on a most significant bit (MSB) of the counter, wherein the counter is configured such that the MSB can be examined to determine if the frequency should be increased or decreased; and increasing or decreasing the clock frequency of a clock based on the determination.

In yet another embodiment, a method for recovering a serial clock of a transmitter for packets sent from the transmitter is provided where packet delay sending the packets from the transmitter to the receiver occurs. The method comprises: receiving a plurality of packets at the receiver; storing the plurality of packets in a buffer; determining a first clock frequency based on a coarse tuning method; determining a second clock frequency using the first clock frequency based on a fine tuning method; adjusting a buffer fill level to a desired fill level by varying the second clock frequency; and maintaining the desired buffer fill level by adjusting the second clock frequency.

In another embodiment, a method for recovering a serial clock of a transmitter for packets sent from the transmitter is provided where packet delay sending the packets from the transmitter to the receiver occurs. The method comprises: (a) changing a clock frequency in a first direction; (b) changing the clock frequency in the first direction until a first trend for packets being written and read from a buffer changes to a second trend; (c) when the first trend changes to the second trend, changing the clock frequency in a second direction until the second trend changes to the first trend for packets being written and read from the buffer changes; and (d) repeating steps (a)–(d) until a certain number of changes in the first and second direction are made.

In another embodiment, a method for adjusting a fill level of a buffer after determining a clock frequency of a transmitter used in sending packets from the transmitter is provided where packet delay in sending the packets from the transmitter to the receiver occurs. The method comprises: (a) determining a desired fill level; (b) receiving a plurality of packets at the receiver; (c) storing the plurality of packets in a buffer; (d) determining a fill level of the buffer for a time period; (e) determining if the fill level is greater than or less than the desired fill level; (f) if the fill level is greater than the desired fill level, determining a trend for prior changes in the fill level for prior time periods; (g) if the prior changes indicate than the fill level has been decreasing, performing steps (a)–(k) without changing the clock frequency; (h) if the prior changes indicate than the fill level has been increasing, increasing the clock frequency and performing steps (a)–(k) without changing the clock frequency; (i) if the fill level is less than the desired fill level, determining a trend for prior changes in the fill level for prior time periods; (j) if the prior changes indicate than the fill level has been increasing, performing steps (a)–(k) without changing the clock frequency; (k) if the prior changes indicate than the fill level has been decreasing, decreasing the clock frequency and performing steps (a)–(k).

A further understanding of the nature and the advantages of the inventions disclosed herein may be realized by reference of the remaining portions of the specification and the attached drawings.

DETAILED DESCRIPTION OF THE INVENTION

Figure 1:
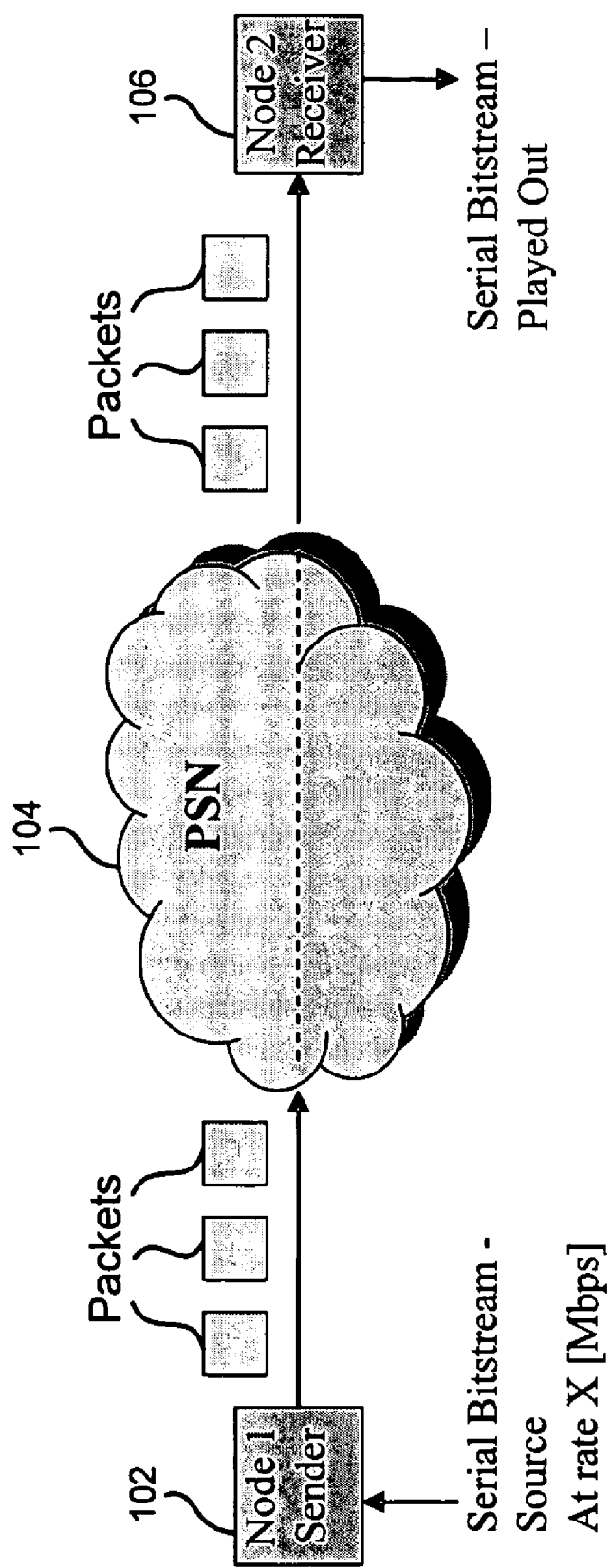
FIG. 1 depicts a system for determining a clock frequency according to one embodiment of the present invention.

FIG. 1 depicts a system 100 for determining a clock frequency according to one embodiment of the present invention. As shown, system 100 includes a sender node 102, a network 104, and a receiver node 106. Packets 108 are sent from sender node 102 through network 104 to receiver node 106. Although sender node 102 and receiver node 106 are shown, it will be understood that any number of sender nodes 102 and receiver nodes 106 may be included in system 100.

Packets 108 may include any data sent through network 104. In one embodiment, a file of data may be broken into chucks of data referred to as packets. The packets may be sent through network 104 in a communication between sender node 102 and receiver node 106. A communication may be any communication of a number of packets. The communication may be a streaming flow of packets. For example, the packets may include information for a streaming video, streaming audio, etc. In another embodiment, the packets may be sent in a communication for a discrete entity; for example, packets including information for a file may be sent in a communication.

Sender node 102 may be any telecommunication device configured to send packets 108. For example, sender node 102 may be a router, switcher, customer premise equipment (CPE), computing device, and the like.

Receiver node 106 may be any telecommunication device configured to receive packets 108. For example, receiver node 106 may be a computer, application, digital set top box, CPE, server, and the like.

Network 104 may be any network. For example, network 104 comprises a packet switched network. Packet switched networks are configured to send packets of data where some packets 108 in a communication may be sent through different paths. Accordingly, because packets 108 may be sent through different paths, packets 108 sent from a sender node 102 to a receiver node 106 may be received at receiver node 106 in different intervals from which they were sent.

Sender node 102 sends packets received from a source in a serial bitstream through network 104. The bitstream is sent at a fixed rate X (in megabits per second). The bitstream is sent using a clock that outputs a frequency. The clock is referred to as the "sender clock".

Sender node 102 is configured to packetize the serial bitstream (i.e., chop the continuous stream into groups of bits), add packet headers/trailers, and send the packets across network 104. When traversing network 104, jitter or packet delay variations may be introduced to the packet stream. Accordingly, the packets may arrive at receiver node 106 at varying intervals and arrival times.

Embodiments of the present invention provide techniques to recover the serial clock at receiver node 102 under conditions such as packet delay variation that is introduced by packet switched network 104. Packet delay variation refers to the fact that although fixed size packets, containing blocks of serial data, are sent at a constant bit rate (CBR) fashion from sender node 102 (i.e., they are equally spaced as appropriate for a constant bit rate), the packets arrive at receiver node 106 nonequally spaced due to different delays that are introduced to each packet traversing packet network 104. Accordingly, PDV affects the ability to recover the serial clock because the rate at which packet data is written into buffer memory 212 is changing on a short term basis. A long-term (average) rate remains fixed since it represents the fixed rate at which packets were generated at sender nodes 102.

Figure 2:
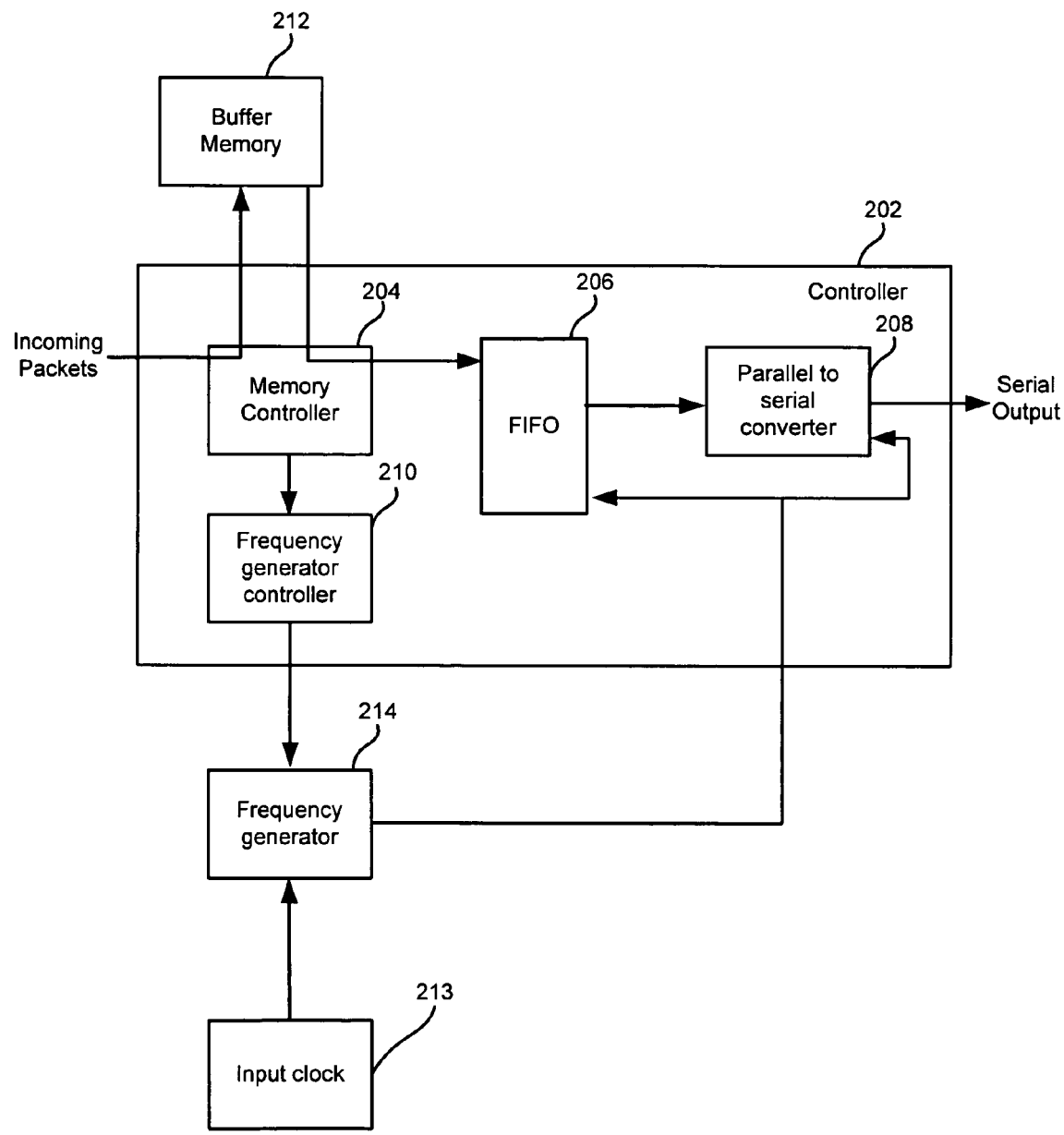
FIG. 2 depicts a simplified block diagram of receiver node according to one embodiment of the present invention.

FIG. 2 depicts a simplified block diagram of receiver node 106 according to one embodiment of the present invention. As shown, receiver node 106 includes a controller 202, which includes a memory controller 204, a FIFO 206, a parallel to serial converter 208, and a frequency generator 210. Receiver 106 also includes a buffer memory 212, an input clock 213, and a frequency generator 214. Although the above components are shown, it should be understood that a person of skill in the art will appreciate other components that may be included in receiver 106.

Receiver node 106 receives packets from sender node 102 and outputs data in the packets in the serial bitstream. A clock frequency is used to output the serial bitstream at a substantially similar frequency as the sender clock used at the sender node 102. Accordingly, this is considered a recovered clock of the sender clock at receiver node 106.

In one embodiment, information about the clock frequency used at sender node 102 is not sent in the packets. Rather, embodiments of the present invention use techniques described below in order to determine a clock frequency to use in playing out the serial bitstream at receiver node 106.

Packets are received at memory controller 204 of controller 202. Memory controller 204 is configured to store the packets in buffer memory 212. In one embodiment, memory controller 204 may be configured to strip off headers/trailers from the packets and store the payload of the packet in buffer memory 212. For purposes of discussion, packets will be referred to as being stored in buffer memory 212. However, it will be understood that any part of the packet may be stored in buffer memory 212. For example, the payload of the packet may be stored. The term "packet" is meant to encompass any of the above.

The packets may be a fixed size. For example, the packets may be the same size and/or include a payload of the same size. Additionally, the packets may be sent over SATop (structure agnostic time division multiplex (TDM)) over IP (Internet Protocol), over Ethernet and may be sent using other protocols.

Buffer memory 212 may be any memory device configured to store information. For example, buffer memory 212 may be an SDRAM, or the like.

At the beginning of the operation, memory controller 204 may fill buffer memory 212 to a desired fill level. A fill level is an amount of data stored in buffer memory 212. The desired fill level may be level that is arbitrarily set by a user or a desired level that is preferred for a communication. The desired fill level may be set such that buffer overflow or underflow is minimized. Once the desired fill level is reached, the process of reading packets out of buffer memory 212 may begin.

Memory controller 204 is configured to read out packets from buffer memory 212 and send it to FIFO 206. FIFO 206 may be a first in/first out storage device. Although a FIFO is described, it will be understood that other storage devices may be used to store the packets read from buffer memory 212.

In one embodiment, memory controller 204 may be configured to read out a fixed size of data from buffer memory 212. Because the sizes of packets (or their payload) sent are fixed, memory controller 204 can determine how much data to read out such that the amount of data read out may constitute a packet.

Memory controller 204 is configured to read out a packet if the packet can be stored in FIFO 206. If a full packet cannot be stored in FIFO 206, memory controller 204 waits until FIFO 206 has enough room before reading out the packet from buffer memory 212. This eliminates the possibility that FIFO 206 may overflow or reach its full condition.

FIFO 206 is used to cross-clock domains. The content of FIFO 206 is read out using a clock frequency generated by frequency generator 214. This clock frequency is locally generated at receiver 106. This frequency may be considered the recovered sender clock. At every clock cycle, data may be read out of FIFO 206. Data may be read out in parallel and sent to a parallel-to-serial converter 208.

Parallel-to-serial converter 208 is configured to convert the parallel data to a serial bitstream. Although parallel-to-serial converter 208 is described, it should be understood that a person skilled in the art will appreciate other techniques for reading data out of FIFO 206 and converting it to a serial bitstream.

Parallel-to-serial converter 208 then outputs the serial data. The serial data may be sent to a serial receiver. A serial receiver may be, for example, a satellite modem with RS-530 serial interface.

Frequency generator controller 210 is configured to control the frequency outputted by frequency generator 214. In one embodiment, frequency generator controller 210 analyzes information received from memory controller 204 in order to determine a frequency that should be outputted by frequency generator 214. In one embodiment, frequency generator controller 210 is configured to determine the frequency based on one or more modes, some of which will be described in more detail below.

Frequency generator 214 may be any device configured to generate a clock frequency. For example, frequency generator 214 may be a direct digital synthesizer (DDS). A DDS may be used for tuning radio frequencies. The device includes a reference input clock and can be controlled through frequency generator controller 210 to output a range of clock frequencies with a very fine granularity. Frequency generator 214 is configured to change frequencies without the need to wait for any settling time. For example, frequency changes may be performed immediately upon programming the new frequency. Frequency generator 214 bases its frequency synthesis on the table of sine wave samples in one embodiment. For example, input clock 213 is used as a reference to generate an output frequency. Frequency generator 214 can generate any output clock rate up to a maximum of half the rate of input clock 213. The outputted frequency is based on the input from frequency generator controller 210. In one embodiment, this method of generating a frequency does not use a phase lock loop (PLL) to generate the clock frequency. Using a PLL to generate a clock frequency may include settling time when a frequency needs to be changed.

Frequency generator controller 210 determines a frequency that should be output by frequency generator 214 using one or more modes, some of which will be described below. The frequency determined may be based on the fill level in buffer memory 212. Memory controller 204 keeps track of a fill level in buffer memory 212. In one embodiment, an up/down counter may be used. The counter is incremented each time a packet is written to buffer memory 212 and is decremented each time a packet is read out from buffer memory 212. Memory controller 204 passes the up/down counter value to frequency generator controller 210 in addition to a 'PktWrPulse' and a 'PktRdPulse', which are signals that pulse once for every time a packet is written and read, respectively, to/from buffer memory 212. 'PktWrPulse' and 'PktRdPulse' may be two signals that go to '1' and then back to '0' whenever a packet is written/read to/from buffer memory 212. These pulses are used in the COARSE and FINE frequency sweep steps described below in the AUTO-BAUD mode to count how many packets are being read (played out) during the time it takes N packets to be written to memory buffer 212.

Frequency generator controller 210 uses the value of the up/down counter to determine the fill level. The fill level and the number of pulses in 'PktWrPulse' and 'PktRdPulse' are used determine whether to increase or decrease the frequency outputted by frequency generator 214. This determination is based on an algorithm being used to determine the frequency.

The frequency outputted by frequency generator 214 (the recovered sender clock) affects the rate of reading data from buffer memory 212 by memory controller 204 because the clock determines how fast FIFO 206 is drained, and therefore, how fast room becomes available in FIFO 206 for another block of data to be written. This is a precondition that memory controller 204 requires in order to read a packet-sized block of data from buffer memory 212.

In general, a feedback loop using the fill level of buffer memory 212 is used to keep the fill level of buffer memory 212 around a desired fill level. Generally, when the fill level is higher than the desired fill level, frequency generator controller 210 programs frequency generator 214 to increase the frequency, which, in turn, drains FIFO 206 faster. This leads to draining data from buffer memory 212 at a faster rate. Accordingly, this eventually leads to reducing the actual fill level such that it becomes closer to the desired fill level. Similarly, the frequency is decreased when the fill level is lower than the desired fill level, which causes an increase in the fill level of buffer memory 212.

In one embodiment, the desired fill level may be configurable by a user of system 100. In one embodiment, the feedback loop system is used to match the actual fill level to the desired/configured fill level by changing the frequency outputted by frequency generator 214. Accordingly, this yields a recovered serial clock frequency that is, on average, substantially equal to the sender clock that was used to send the serial data at sender node 102.

Modes

As mentioned above, frequency generator controller 210 may determine a frequency that should be outputted by frequency generator 214 using many modes. The following modes will be described below: a baud rate generator (BRG) mode, an adaptive timing mode, and an auto-baud mode. Although the following modes are described, it should be understood that other modes may be appreciated.

Baud Rate Generator Mode

In the baud rate generator mode, frequency generator controller 210 is configured to program frequency generator 214 to output a fixed frequency that is based on a system clock. A system clock is one or more clocks that are available as reference clocks to all devices in a system. For example, all function/processing in system 100 may use the system clock. The system clocks are traceable to an accurate timing reference source that is used as a master timing source for the whole system. In one embodiment, multiple timing sources (system clocks) may be provided. The multiple system clocks may be used to generate a frequency for frequency generator 214.

Figure 3:
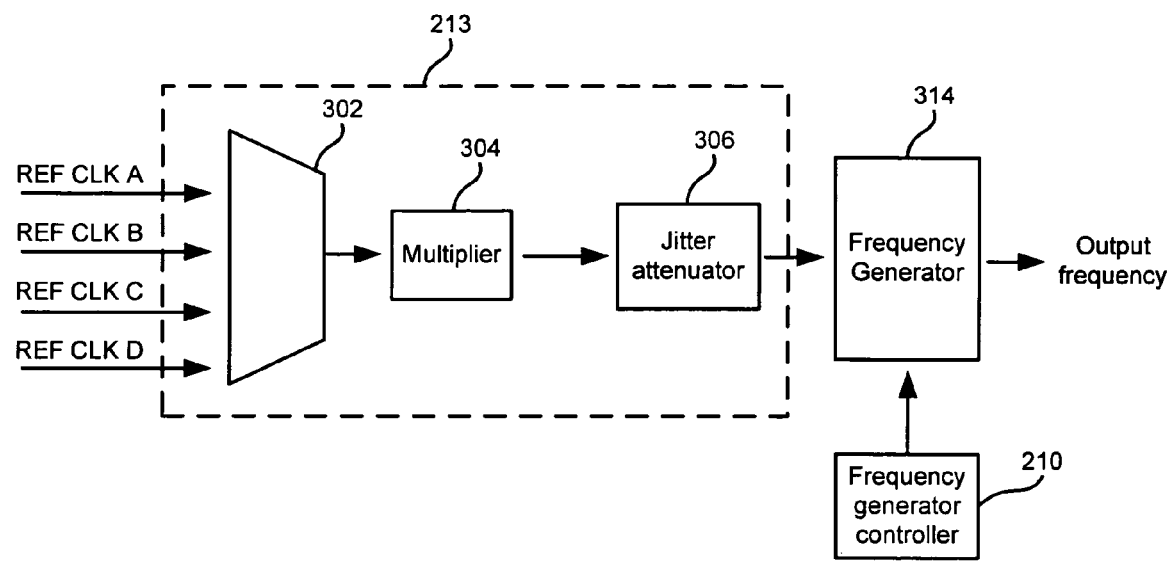
FIG. 3 depicts a simplified block diagram of a system for generating a frequency using the baud rate generator mode.

FIG. 3 depicts a simplified block diagram of a system for generating a frequency using the baud rate generator mode. As shown, input clock 213 may include one or more reference clocks labeled REF CLK A, REF CLK B, REF CLK C, REF CLK D are provided. It will be understood that any number of reference clocks may be provided.

The reference clocks are received and input into a multiplexer 302. The multiplexer is used to select one of the system clocks.

The selected reference clock is then input into a multiplier 304. In one embodiment, the multiplier is implemented using a digital clock manager (DCM). The DCM is configured to multiply the reference clock to generate a higher frequency source clock. Multiplier 304 may, for example, multiply a system clock by 16. Multiplier may be used because the system clock may be at a lower frequency that what is desired. It will be understood that a multiplier may not be used and the system clocks may just be used without multiplication.

The multiplied clock signal is then sent to an attenuator 306, which is used to reduce jitter on the input clock to frequency generator 214. The attenuated and multiplied reference clock is then sent to frequency generator 214. The inputted reference clock is then used to generate an output frequency that is used as the recovered serial clock.

Adaptive Timing Mode

Figure 4:
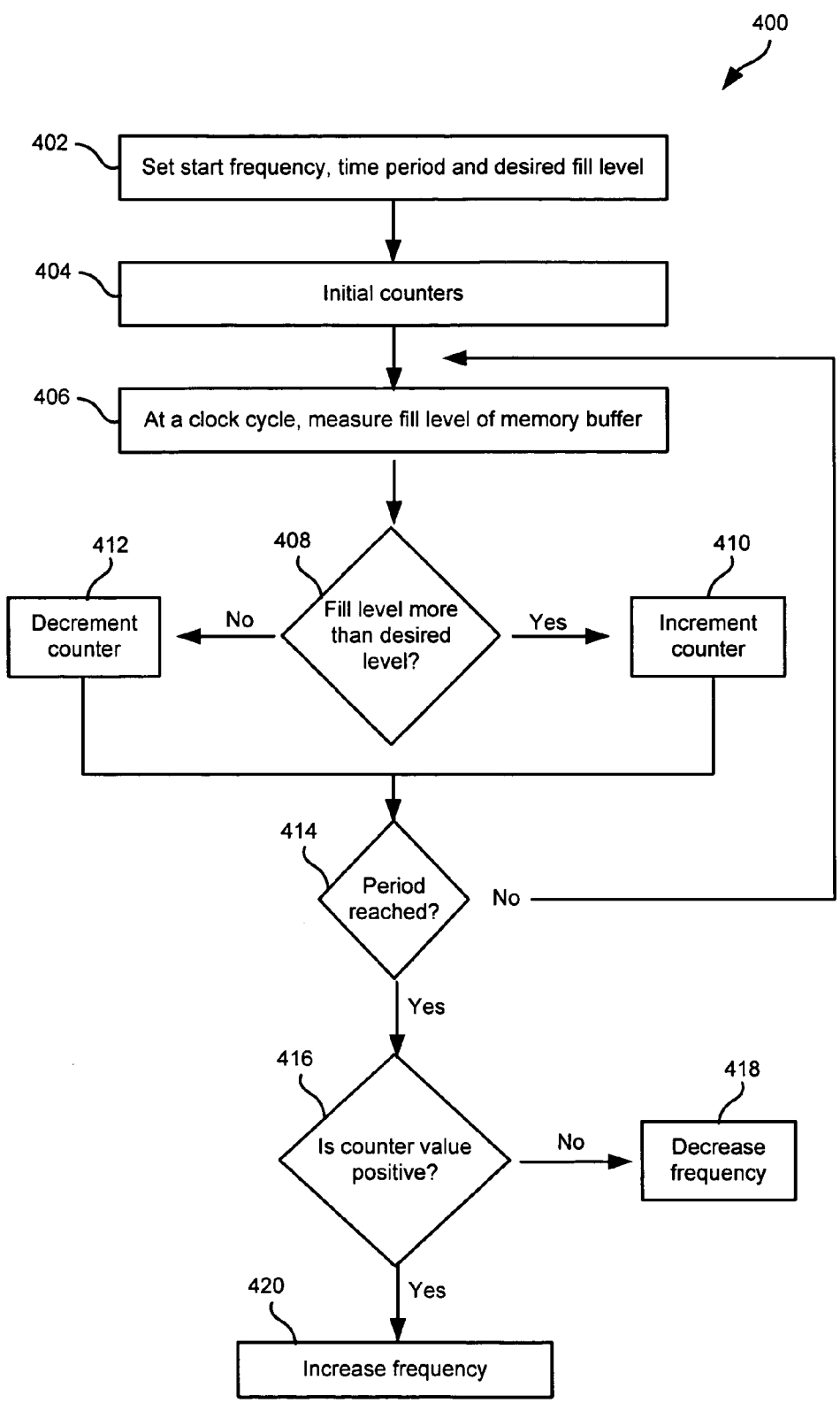
FIG. 4 depicts a simplified flowchart of a method for performing the adaptive timing mode according to one embodiment of the present invention.

FIG. 4 depicts a simplified flowchart 400 of a method for performing the adaptive timing mode according to one embodiment of the present invention. Using this mode, frequency generator controller 210 is configured to program frequency generator 214 to output a frequency in which small corrections may be made to a preconfigured start frequency. The start, or nominal, frequency may be specified as a frequency that is similar to the sender clock frequency used to send the data packets at the sender node 102. The start frequency, however, may need to be varied because this nominal frequency is based on the local reference clock of receiver node 106, which may be slightly different from the sender clock frequency of sender node 102. In one embodiment, the fill level of buffer memory 212 is monitored over a period of time and adjustments to the frequency outputted by frequency generator 214 are made.

In step 402, a start frequency, time period, and desired fill level is set. For example, a user may set the start frequency as a frequency that is similar to a sender clock frequency used by sender node 102 when sending the data packets. The time period may be any amount of time. For example, the time period may be an amount of time such that the effect of short term variations in packet delay variation may be minimized. The desired fill level may be a fill level of buffer memory 212 that is desired to be maintained. For example, the fill level may be a level in which buffer memory 212 may not easily overflow or underflow (i.e. the center of the buffer).

In step 404, an up/down counter is initialized. The counter may be used in order to average the fill level. The value of the counter is then used to determine whether to increase or decrease the frequency output by frequency generator 214. The counter may be initialized to any beginning value, such as zero.

In step 406, in each clock cycle, the fill level is measured in buffer memory 212. Frequency generator 214 is outputting a clock frequency. In each clock frequency, a data packet may be read from FIFO 206. During this time, memory controller 204 is configured to read packets from buffer memory 212, whenever possible, and send them to FIFO 206. Also, packets are being written to buffer memory 212. The number of packets written to and read from buffer memory 212 varies. Accordingly, this process affects the fill level. At every clock cycle, memory controller 204 may measure the fill level of the memory buffer.

In step 408, frequency generator controller 210 determines if the fill level is more than the desired level. If the fill level is more than the desired level, the counter may be incremented in step 410. If the fill level is not more than the desired level, the counter may be decremented in step 412.

In step 414, frequency generator controller 210 determines if the time period is reached. If the time period has not been reached, the process reiterates to step 406 where the fill level is determined again. At every clock cycle until the time period is reached, the fill level of buffer memory is measured and the counter is incremented or decremented.

In step 416, when the time period has been reached, frequency generator controller 210 determines if the average fill level is greater than the desired fill level. In one embodiment, frequency generator controller 210 uses the counter to determine if the average fill level is greater than the desired fill level. For example, if a counter started at 0, the fill level may be more than the desired fill level if it is a positive number because the counter would be incremented more than it would have been decremented. If the number is a negative number, then the fill level would be less than the desired fill level because the counter would have been decremented more than it would have been incremented.

In step 418, the frequency outputted by frequency generator 214 is decreased if the fill level is less than the desired fill level. A frequency-delta may be set in which the frequency is decreased by (and also increased). In this case, because the frequency outputted by frequency generator 214 is decreased, then the number data packets read out of FIFO 206 is decreased because fewer reads are performed at FIFO 206 because reads are performed at every clock cycle. Accordingly, because memory controller 204 is configured to read data packets from buffer memory 212 only when a packet of data can be written to FIFO 206, the fill level of buffer memory 212 may increase.

In step 420, the frequency outputted by frequency generator 214 is increased by the set frequency-delta if the fill level is greater than the desired fill level. In this case, the example, up to $(2^{15})-1$ or 32,767 sampling points are supported at every averaging interval because the up/down counter is 16 bits wide. This allows the MSB to be used as an indicator to determine whether the counter has been incremented more than it was decremented. Because the MSB is the "sign" bit, there are 15 bits, or 32,767 to count and therefore the sampling period should not be set to have more than 32,767 sampling points.

The following shows an example of code that may be used to implement the method depicted in FIG. 4.

```
//averaging function. Each clk4096 tick, inc/dec an up/down counter 'UpDownCnt'.
//When the timer 'FreqUpdateInterval' expires, we check the 'UpDownCnt' value
//and increase or decrease the frequency of the DDS. We look at the MSB of
//UpDownCnt to determine whether the jitter buffer was under-nominal or over-nominal
//fill-level most of the time during the past interval.
//NOTE: 'UpDownCnt' is 16 bit, so it can only accomodate 'FreqUpdateInterval' values
//         of up to 15 bit worth (i.e. half the range represented by 16 bits). This means
//         MSB of 'FreqUpdateInterval' must always be ZERO. This allows for an averaging
//         interval of up to (2A^15) clk4096 ticks, which is 8 ms.
//         In order to keep away from the aliasing zone, restrict SW to set
//         'FreqUpdateInterval' to values up to [(2^15) – 10].
/////////////////////////////////////////////
always @(posedge clk4096 or posedge reset)
if (reset) begin
        clk4096_cnt  <= 16'h0000;
        UpDownCnt    <= 16'h0000;
end else begin
        if (clk4096_cnt = FreqUpdateInterval) begin //time to update DDS Frequency
            clk4096_cnt    <= #1 16'h0000;
            UpDownCnt      <= #1 16'h0000; //initialize for next averaging interval
        end else begin
            clk4096_cnt    <= #1 clk4096_cnt + 1;
            if (PktCount_sampled > BuffCenterPktCount[11:0])    //check fill-level against nominal
                UpDownCnt  <= #1 UpDownCnt + 1;
            else
                UpDownCnt  <=#1 UpDownCnt – 1;
        end
end
``` frequency of reads to FIFO 206 is increased because the clock frequency is increased. Accordingly, memory controller 204 may read more packets from buffer memory 212 and send them to FIFO 206 because the number of packets outputted by FIFO 206 increase because of the number of reads to FIFO 206 is increased. Accordingly, the buffer fill level in buffer memory 212 may be decreased.

In one example, a slow clock (e.g., 4.096 MHz) is used to determine sampling points to determine the fill level of buffer memory 212. The counter is increased or decreased by one at each sampling point based on the fill level of buffer memory 212. In one example, a hex value of 0x0000 (16 bits in this example) is used. The most significant bit (MSB) is used to determine if a fill level is greater than the desired fill level. If, at the end of the sampling period the MSB is "0", this means that more samples had an actual fill level that was higher than the desired fill level. When the counter is decremented by 1 from the value of 0x0000, it rolls over to 0xffff (all 1's). Thus, if the MSB is 1, then that means the counter was decremented more than it was incremented. This assumes that the sampling points are less than the value of the hex number.

When the number of samples is determined, the time period is up and the MSB is examined. In one embodiment, a restriction is applied such that the number of sample points cannot exceed half the maximum value that is represented by the number of bits in the up/down counter. In this Autobaud Mode In this mode, receiver node 106 recovers the sender clock (bit rate) of the serial bit stream without any knowledge of the sender frequency. In this embodiment, receiver node 106 is not programmed with a desired ("nominal") frequency as is programmed in the adaptive timing mode. Accordingly, receiver node 106 does not know which frequency to start outputting serial packets with. When packets carrying data of the serial bitstream start to arrive at receiver node 106, a series of steps is performed in order to determine the sender clock.

Figure 5:
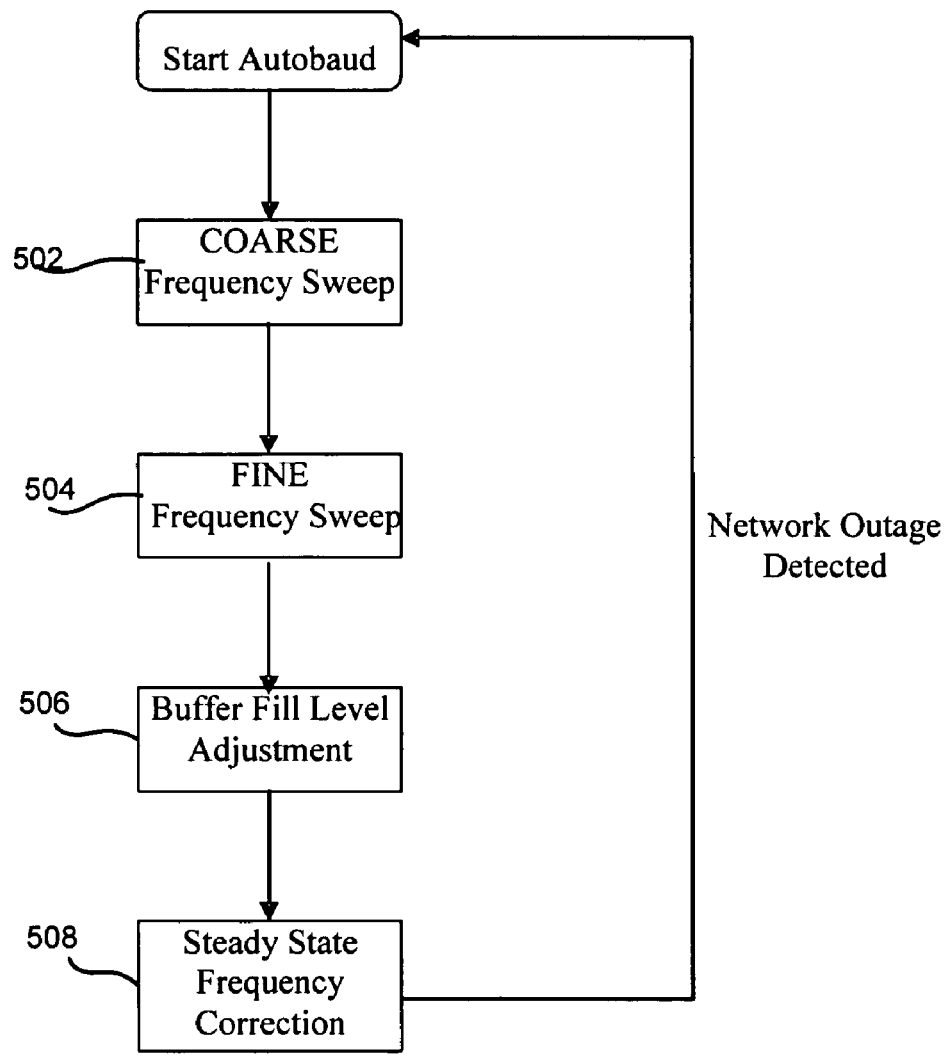
FIG. 5 depicts a simplified flowchart of a method for determining a clock frequency using the autobaud method according to one embodiment of the present invention.

FIG. 5 depicts a simplified flowchart 500 of a method for determining a clock frequency using the autobaud method according to one embodiment of the present invention. In step 502, a course frequency sweep is performed. Generally, the course frequency sweep process starts from a low end of a frequency range and sweeps up by increments of some delta of frequency. A number of packets being read from buffer memory 212 are recorded during a period of time that N number of packets are written. After each period, the frequency is incremented until the amount of packets read from buffer memory 212 is greater than the N number of packets written. The rough sweep frequency recorded yields a rough estimation for the sender clock. This process will be described in more detail below.

In step 504, a fine frequency sweep process is performed. In the fine frequency sweep process, the frequency found in the coarse frequency sweep process is used. The fine frequency sweep process may be performed in increments of a smaller delta than the increments used in the coarse frequency sweep process. For a period of time, a number of packets read from buffer memory 212 are recorded during a period of time that X packets are written. There are two iterations referred to as sweeping down and sweeping up that are performed in order to determine sweep down and sweep up frequencies. A fine sweep frequency is then determined based on the sweep up and sweep down frequencies and considered the recovered sender clock. This process will be described in more detail below.

In step 506, a buffer fill level adjustment is performed. In this step, the buffer fill level after the course frequency sweep and the fine frequency sweep is determined. The fill level is then compared against a desired fill level. The fill level is then adjusted to the desired fill level. In one embodiment, the frequency may be temporarily offset in an appropriate direction in order to adjust the fill level. For example, the frequency may be increased if the fill level should be decreased and the frequency may be decreased if the fill level should be increased. This process will be described in more detail below.

In step 508, a steady state frequency adjustment is performed. In this step, the state of the buffer fill level is averaged across a period of time as defined by the number of packets read from a buffer. At the end of the period, a small correction to the frequency determined in step 504 based on the average fill level may be made. Accordingly, the above process determines a recovered sender clock and adjusts the clock to maintain the buffer fill level (and thus the sender clock frequency).

Figure 6:
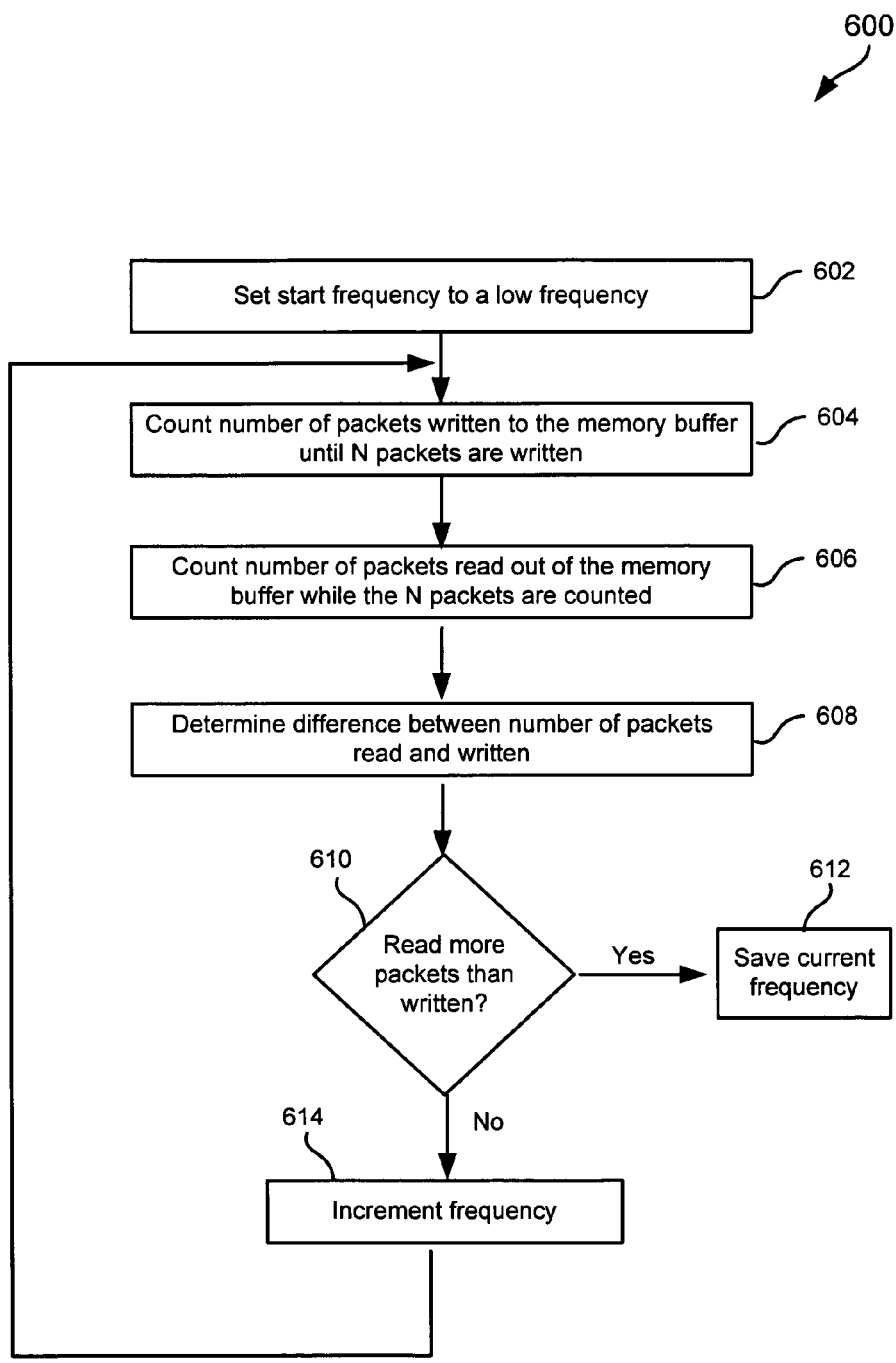
FIG. 6 depicts a simplified flowchart of a method for performing the coarse frequency sweep according to one embodiment of the present invention.

FIG. 6 depicts a simplified flowchart 600 of a method for performing the coarse frequency sweep according to one embodiment of the present invention. In step 602, a frequency is set to a low frequency. Although a low frequency is used, it should be understood that any frequency may be used.

In one embodiment, a lower frequency is used because it may take less time in order to determine the frequency desired for the coarse frequency sweep. For example, the frequency is adjusted after a period of time. The period used may be based on the number of packets written to memory buffer 212. If the sender frequency is a low frequency, it takes longer for packets to be sent and thus arrive at receiver node 106. Accordingly, the time to count the number of packets written to memory buffer 212 is longer than if the sender frequency is faster. Accordingly, if the rough frequency sweep started at a high frequency and the frequency that is sending the packets at the sender node 102 is at a low frequency, then it would take a long time to adjust the high frequency to be lower than the low frequency. This is because the time to count the N number of packets written to memory buffer 212 is long because of the low sender frequency. Accordingly, the time it takes to decrease the high frequency to the desired frequency may be long. In the opposite example, when the sender frequency being used to send the packets at a sender node 102 is a high frequency, the time to count the number of packets written to memory buffer 212 is shorter. Accordingly, even though the start frequency is started at a low frequency, the time it takes to increase the start frequency to the desired frequency is less because the time it takes to count the number of packets written is less because packets arrive at a faster rate.

In step 604, the number of packets written to memory buffer 212 is counted until N packets are written. In step 606, while the N packets are being written, the number of packets read out of memory buffer 212 is counted.

In step 608, the difference between the packets read and written is determined. In step 610, it is determined if more packets were read than were written. If more packets were read, it is inferred that the receiver frequency is greater than the sender frequency of sender node 102. Although it is not certain if the receiver frequency is greater than the sender frequency in the coarse frequency sweeping phase, just reading more packets than writing more packets is sufficient.

In step 612, the current frequency is then saved. The process then proceeds to the fine frequency sweeping process described in FIGS. 7A and 7B.

In step 614, if more packets were written than read, then the receiver frequency is increased. The receiver frequency is increased because the frequency controls how many packets are read out of buffer memory 212 and it is inferred that it may be slower than the sender frequency because more packets were written than read from buffer memory 212. Accordingly, the frequency is increased such that more packets may be read out of buffer memory 212 during the time that N packets are written to buffer memory 212. The process then reiterates to step 604 where the above process is performed again until more packets are read than written, and then the current frequency is saved.

The process then proceeds to the fine frequency sweep process. The fine frequency sweep process includes a sweep down and sweep up process. The receiver frequency is determined based on the sweep down and sweep up process. Although the sweep down and sweep up processes are described, it will be recognized that any number of sweep up and sweep down processes may be performed.

Figure 7A:
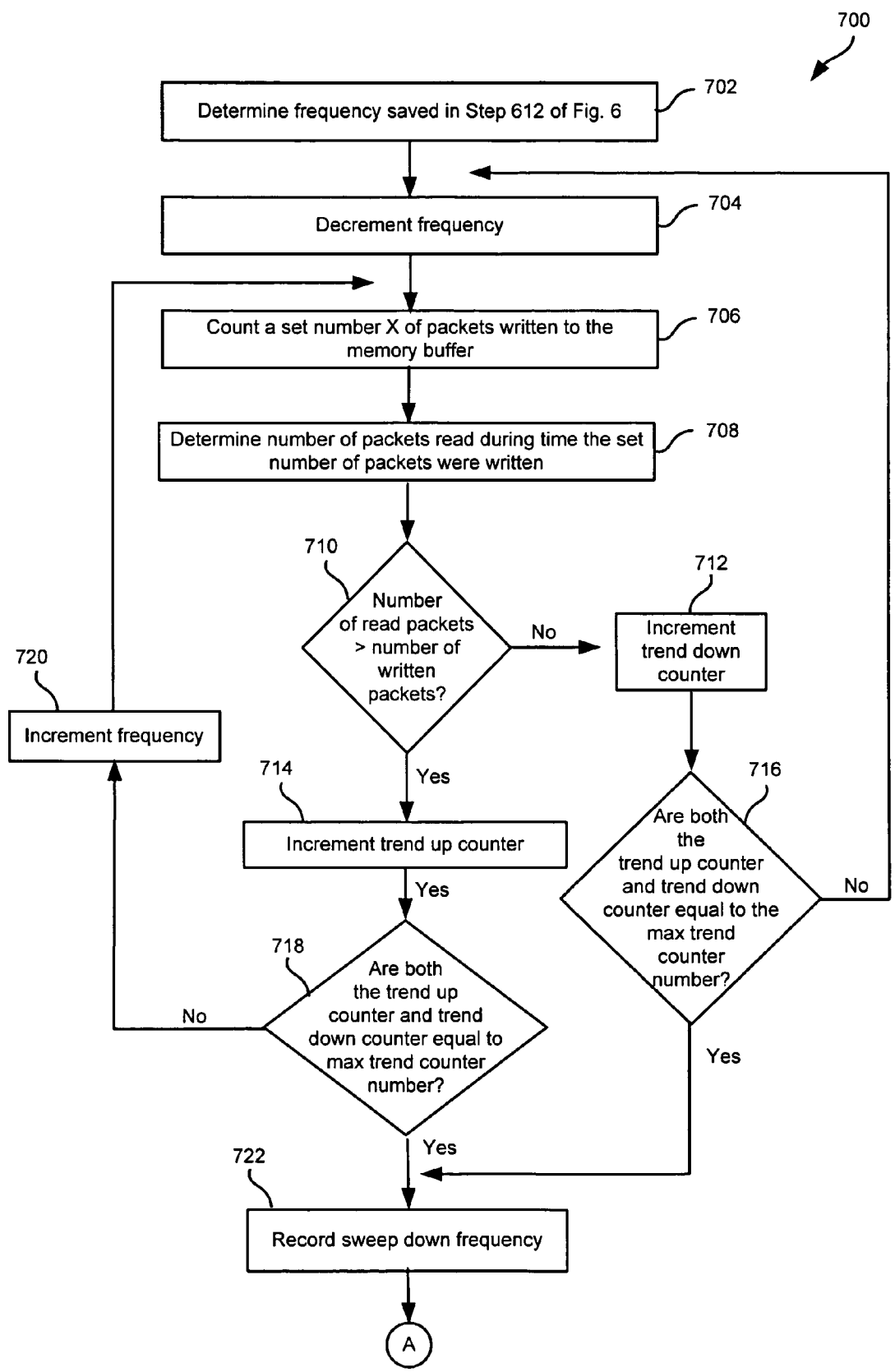
FIG. 7A depicts a simplified flowchart of a method for performing a sweep down according to one embodiment of the present invention. The process then proceeds to FIG. 7B where a sweep up process is performed.

FIG. 7A depicts a simplified flowchart 700 of a method for performing a sweep down according to one embodiment of the present invention. In step 702, the frequency saved in step 612 of FIG. 6 is determined. This is the frequency in which the process starts.

In step 704, the frequency is decremented. Because the coarse frequency sweep process incremented the frequency until the frequency was greater than the sender frequency, it is known that the frequency may be greater than the sender frequency. Thus, the frequency is decremented. The sweeping down process decreases the frequency by a smaller delta than the delta set in the coarse frequency sweep.

In step 706, a set number of packets are read. The set number may be less than the number of packets used in the course frequency sweeping process. However, the set number of packets may be any number of packets.

In step 708, a number of packets read during the time a set amount of packets are written to memory buffer 212 are determined. The number of packets, Y, read may be counted until the set number X packets is written to memory buffer 212 is counted.

In step 710, it is determined if the number of packets read is greater than the number of packets written. If the number of read packets is not greater than the number of packets written, a trend down counter is incremented in step 712. The trend down counter is incremented because the number of packets being read from memory buffer 212 is greater than the number of packets being written. Accordingly, a frequency should be decremented in this case. Accordingly, it is determined that the frequency trend is down and a trend down counter is incremented.

In step 714, if the number of read packets are not greater than the number of written packets, the trend up counter is incremented. The trend up counter is incremented because the number of read packets is less than the number of written packets and thus the frequency should be increased in order to read more packets from buffer memory 212. Accordingly, it is determined that the frequency trend is up and a trend up counter is incremented.

In step 716, if the trend down counter is incremented, it is determined if both the trend up counter and the trend down counter are equal to a max trend counter number. For example, a number may be determined as a max trend counter number. The max trend counter number is used such that a certain amount of time may pass where the trend down counter and the trend up counter are incremented. If the trend down counter and the trend up counter are not equal to the max trend counter number, the process reiterates to step 704 where the frequency is decremented again. The frequency is decremented because it is desired that the number of packets read from buffer memory 212 is decreased over the time period needed to write the number of X packets.

If the trend up counter and trend down counter are equal to the max trend counter number, the process proceeds to step 722, which will be described below.

In step 718, if the trend up counter is incremented, it is determined if both the trend up counter and the trend down counter are equal to the max trend counter number. If they are not, in step 720, the frequency of the clock is incremented. The frequency of the clock is incremented because it is desired that the number of packets read from memory buffer 212 is increased over the time period needed to write the number of X packets. The process then reiterates to step 706 where the set number of X packets written to memory buffer 212 is counted again and the number of packets read during the time a set number of packets X were written is determined.

If the trend up counter and trend down counter are equal to the max trend counter number, the process proceeds to step 722, which will be described below.

The above process continues until the trend up counter and trend down counter are equal to the max trend counter number. When this happens, in step 722, the current frequency is recorded. This is referred to as the sweep down frequency. This process started from a frequency that may be greater than the sender frequency and is decreased until the frequency may be less than the sender frequency (i.e., when the number of packets read is less than the number of packets written, e.g., Y=X-1). When the sweep-down process ends, i.e. trend_up_cnt=trend_down_cnt=max trend counter nubmer, then the frequency is such that Y<X (i.e., Y=X-1). This frequency is lower than the sender frequency. The process then proceeds to FIG. 7B where a sweep up process is performed.

In step 724, the trend up and trend down counters are reinitialized. The trend up and trend down counters are reinitialized such that they can be incremented again to the maximum trend counter number.

In step 726, the receiver sweep down frequency is incremented. The frequency is incremented because typically the receiver sweep down frequency is lower than the sender frequency, i.e., Y<X.

In step 728, a set number of packets X is written. In step 730, the number of packets, Y, read during the time the set number of packets was written is determined.

In step 732, it is determined if the number of packets read is less than the number of packets written. If the number of packets read is not less than the number of packets written, the trend up counter is incremented in step 734. The trend up counter is incremented because the number of packets read is less than the number of packets written and thus it is determined that the frequency should be increased.

In step 736, if the number of read packets is not less than the number of written packets, the trend down counter is incremented. The trend down counter is incremented because the number of read packets is greater than the number of written packets and thus the frequency should be decremented. Accordingly, it is determined that the trend is down and the trend down counter is incremented.

In steps 738 and 742, it is determined if both the trend up and trend down counters are equal to the max trend counter number. After step 738, if the trend up and trend down counters are not equal to the max trend counter number, then the process reiterates to step 726 where the frequency is incremented. After step 742, if the trend up and trend down counters are not equal to the max trend counter number, in step 740, the frequency is decremented. The process then reiterates to step 728. The process then proceeds as above in both cases until the trend up and trend down counters are equal to the max trend counter number.

In step 744, when the trend up and trend down counter numbers are equal to the max trend counter number, a sweep up frequency is recorded. When sweep up process ends, the frequency is such that Y=X+1, i.e., the frequency is higher than the sender's frequency.

In step 746, a receiver frequency is determined based on the sweep down frequency and the sweep up frequency. For example, both frequencies may be averaged to determine the receiver frequency.

Figure 7B:
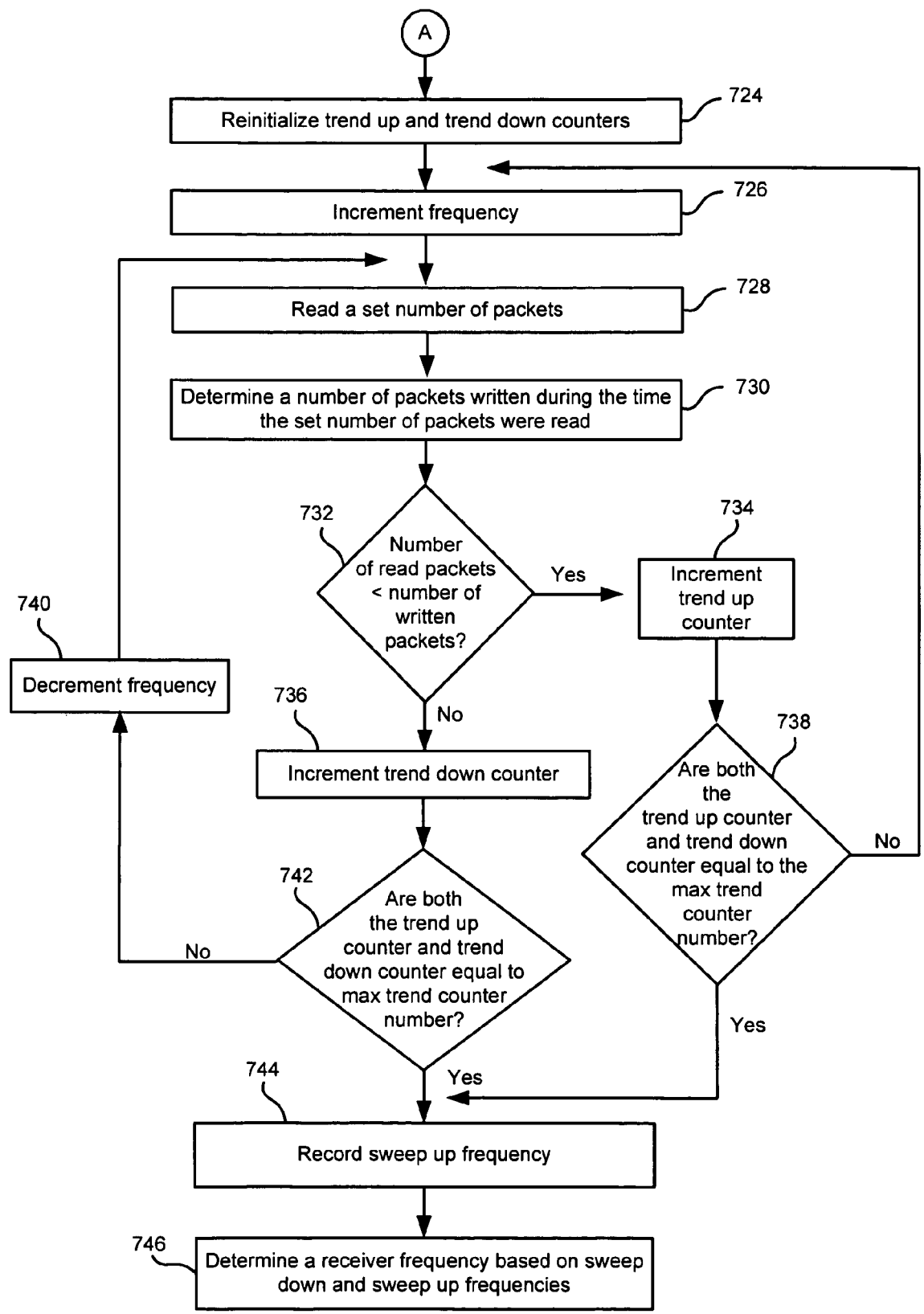
Figure 8:
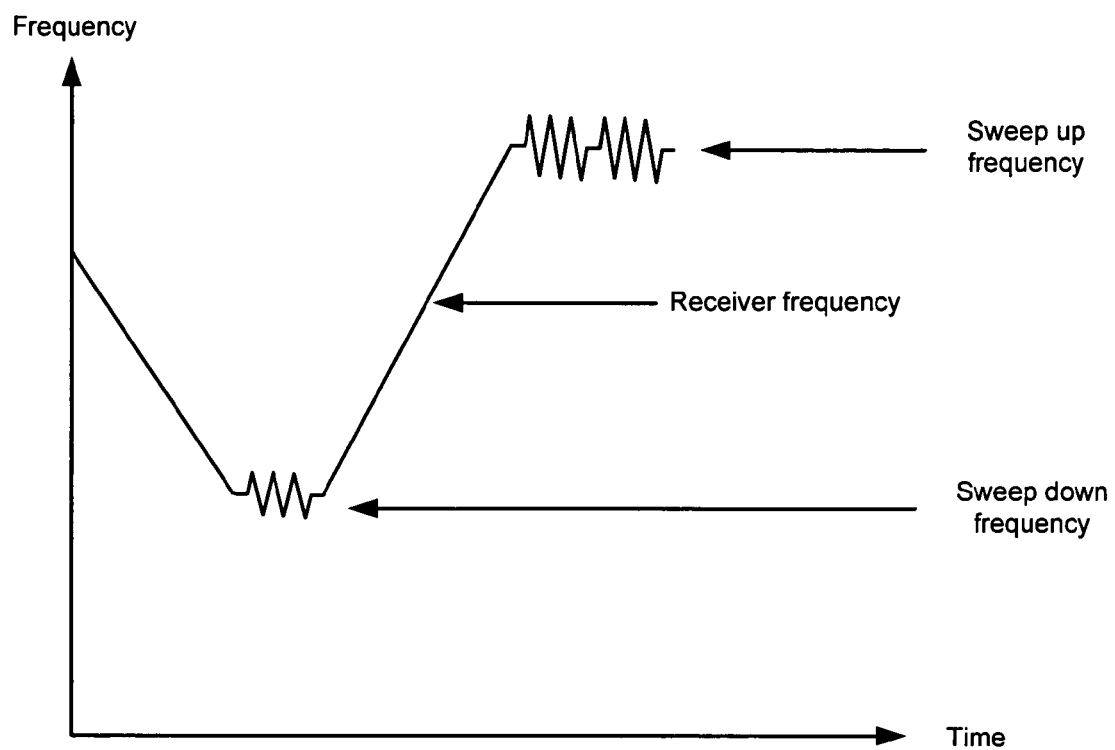
FIG. 8 depicts a graph of the frequency as it is incremented and decremented through the process performed in FIGS. 7A and 7B.

FIG. 8 depicts a graph of the frequency as it is incremented and decremented through the process performed in FIGS. 7A and 7B. As shown, the Y axis represents the frequency and the X axis represents time. At the beginning, the frequency starting point is decremented until the packets read from memory buffer 212 is less than the packets written. At this point, the frequency may be increased or decreased until the trend up and trend down counters are equal to the max trend number. This is considered the sweep down frequency.

At this point, the frequency is increased until the number of packets read is greater than the number of packets written. The frequency is increased or decreased most likely at this point until the trend up and trend down counters are equal to the max trend counter number. This is considered the sweep up frequency. The sweep up frequency and sweep down frequencies are determined and then averaged to determine the receiver frequency. This approximation for determining the receiver frequency results in a frequency approximation that is resistant to packet delay variation. This is because the frequency determined is not determined based on the first indication of a trend change (i.e., either more packets are read than written or less packets are read than written). These trends may be caused by one time PDV-related events. Accordingly, frequency generator controller 210 checks for multiple persistent indications that a correct frequency approximation has been reached before determining the receiver frequency.

The following depicts an embodiment of code configured to implement the method described in FIGS. 7A and 7B.

```
FINE_COMPARE: begin
    if (sweep_up) begin      //sweeping up (second iteration):
        if(Y > X) begin
            decrement              <= #1 1'b0;
            if(trend_dwn_cnt != 3'h7)
                trend_dwn_cnt      <= #1 trend_dwn_cnt + 1;
        end
```

-continued

```
        end else begin //sweeping down (first iteration):
            if(Y < X) begin
                decrement            <= #1' 1b0;
                if (trend_up_cnt != 3'h7)
                trend_up_cnt         <= #1 trend_up_cnt + 1;
            end else begin
                decrement            <= #1 1'b1;
                if (trend_dwn_cnt 3'h7)
                    trend_dwn_cnt    <= #1 trend_dwn_cnt + 1;
            end
        end
        if ((trend_up_cnt == 3'h7) && (trend_dwn_cnt == 3'h7)) begin
            if (sweep_up) begin
                nominal_freq_found_high <= #1 Current_DDS_Frequency;
                state   <= #1 <next phase>;
            end else begin
                state            <= #1 SET_FINE_FREQ;
                trend_up_cnt     <= #1 3'h0;
                trend_dwn_cnt    <= #1 3'h0;
                sweep_up         <= #1 1'b1;
                nominal_freq_found_low <= #1 Current_DDS_Frequency;
            end
        end else begin
            state <= #1 SET_FINE_FREQ; //go back to try the next frequency
        end
end
```

After the receiver frequency is determined, the fill level of buffer memory 212 may be adjusted. In determining the receiver frequency, the fill level of buffer memory 212 may or may not be around a desired fill level. Accordingly, the following process is performed to bring the fill level to the desired fill level.

Figure 9:
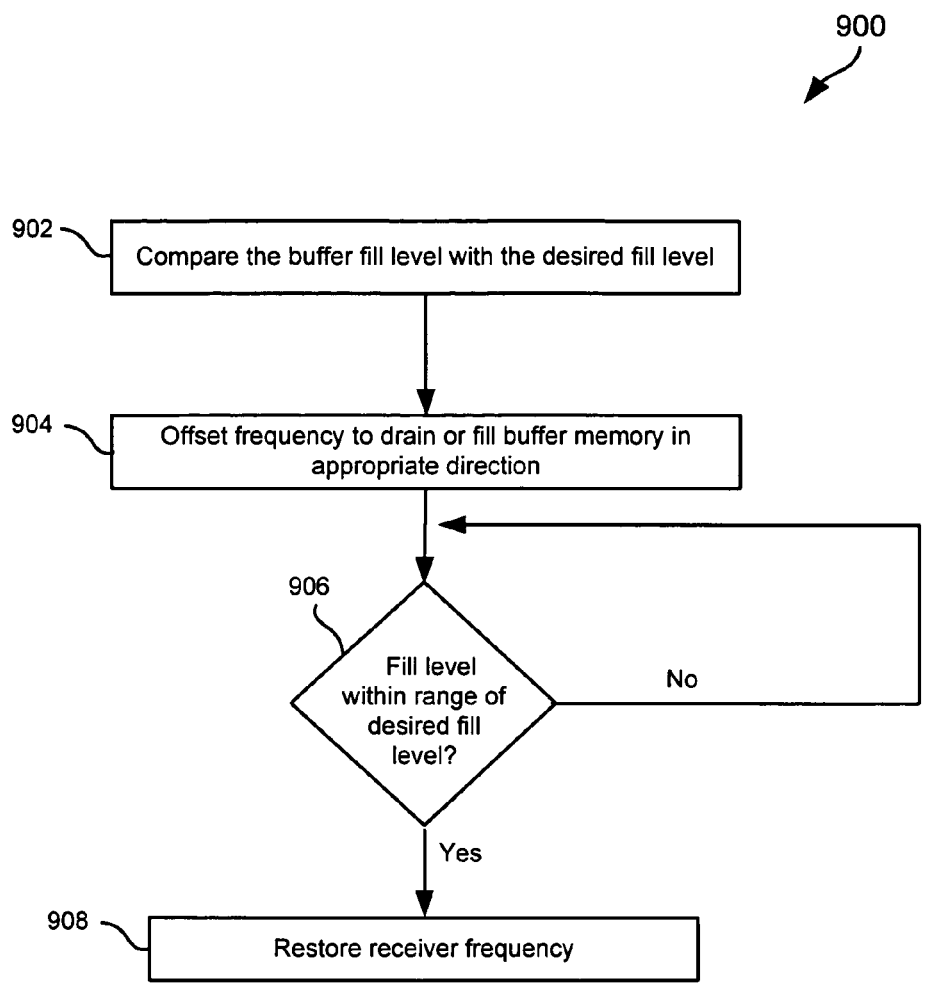
FIG. 9 depicts a simplified flowchart of a method for performing the buffer fill level adjustment of step 506 of FIG. 5 according to one embodiment of the present invention.

FIG. 9 depicts a simplified flowchart of a method for performing the buffer fill level adjustment of step 506 of FIG. 5 according to one embodiment of the present invention. In step 902, the buffer fill level is compared with the desired fill level. In step 904, the receiver frequency is offset to drain or fill the buffer memory 212 in the appropriate direction. For example, if the buffer fill level is greater than the desired fill level, the frequency may be increased in order to drain buffer memory 212. If the buffer fill level is less than the desired fill level, the frequency may be decreased in order to increase the fill level of buffer memory 212.

In one embodiment, the bit rate of the receiver frequency is used to determine how much the frequency is offset. For example, if the receiver frequency is a higher frequency, then the offset may be a higher frequency. This would ensure that the offset is offset enough where it will affect the fill level of the buffer memory 212. For example, if the frequency is 1 MHz, and the offset is for 1 Hz, then the difference in frequency will not be noticeable to make an affect on the fill level. However, if the difference is 100 KHz, then the offset may be noticeable and the fill level may be adjusted. On the other hand, if the receiver frequency is 5 KHz, and the change in frequency is 1 MHz, then the offset frequency is too great in order to accurately offset the nominal frequency because the fill level will change in large increments thus overshooting the desired fill level.

In another embodiment, the frequency may be increased or decreased by an offset that is based on the difference between the buffer fill level and the desired fill level. For example, if the difference between the buffer fill level and the desired fill level is greater, the offset of the frequency may be greater. If the difference is smaller, then the offset of the frequency may be smaller. For example, if the comparison yields higher significant bits, the frequency may be increased or decreased in larger increments.

In step 906, it is determined if the fill level is within a range of the desired fill level. For example, it may be necessary to exactly offset the frequencies such that the buffer fill level is exactly the same as the desired fill level. Accordingly, a range for the desired fill level may be provided. If the buffer fill level is not within the range of the desired fill level, the process reiterates to step 906 where it is determined if the fill level is within a range of the desired fill level.

In step 908, if the fill level is within the range of the desired fill level, the receiver frequency is restored. This is the frequency that was offset and determined in FIGS. 7A and 7B. This frequency is considered the recovered sender clock and thus, the clock should be returned to that frequency when the desired fill level is reached. In this case, the frequency was offset only to adjust the buffer fill level.

Figure 10:
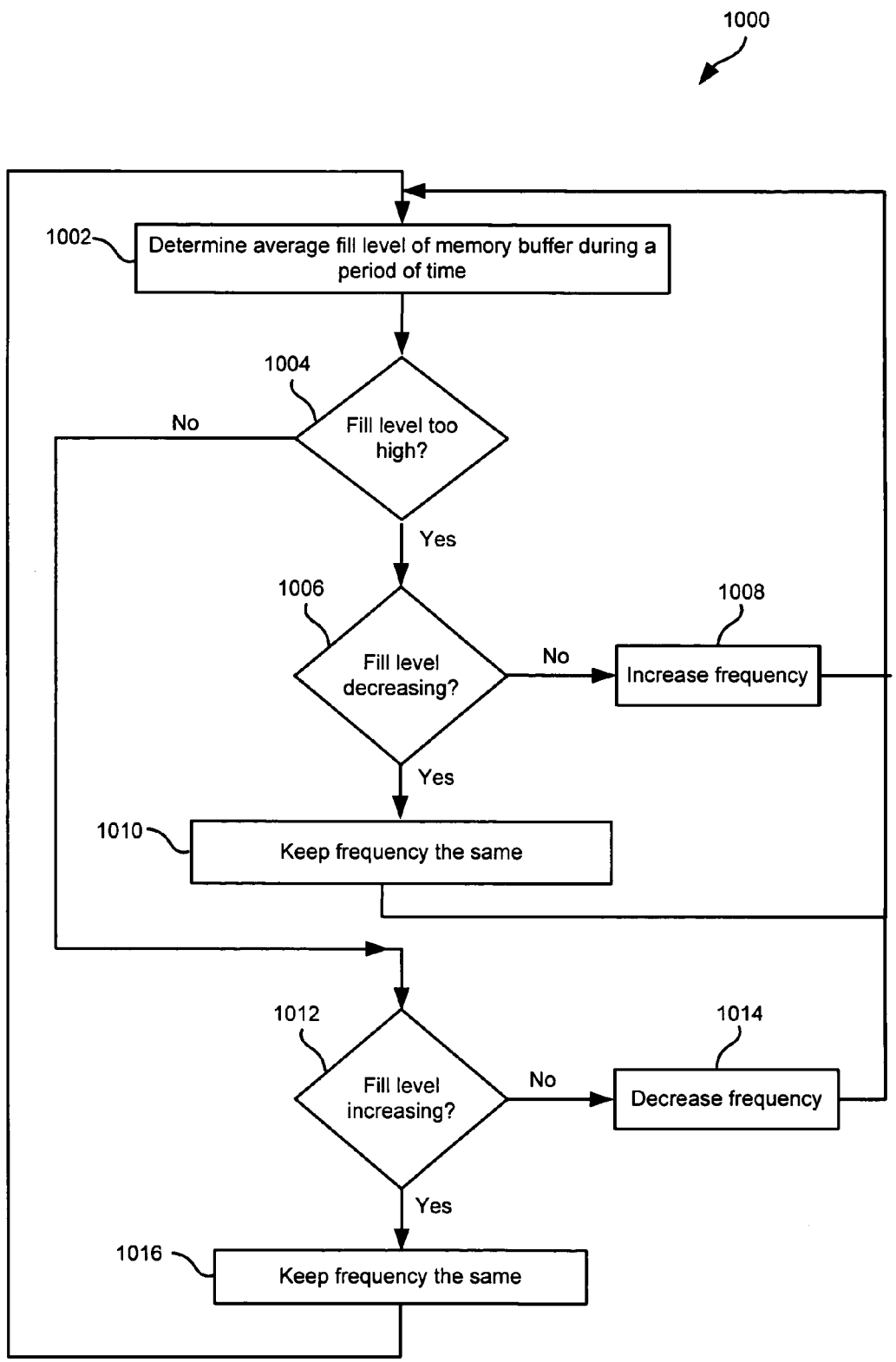
FIG. 10 depicts a simplified flowchart of a more detailed method for steady state adjustment step 508 of FIG. 5 according to one embodiment of the present invention.

FIG. 10 depicts a simplified flowchart 1000 of amore detailed method for steady state adjustment step 508 of FIG. 5 according to one embodiment of the present invention. In step 1002, the average fill level of buffer memory 212 during a period of time is determined. The process uses a small correction to the frequency after the period of time has elapsed. This allows for small corrections to the frequency based on an average fill level.

In step 1004, it is determined if the fill level is too high. If the fill level is too high, in step 1006, it is determined if the fill level is decreasing. If the fill level is not decreasing, then in step 1008, the frequency is increased. The frequency is increased because the fill level is too high and it is not decreasing. Accordingly, the frequency should be increased such that the fill level of buffer memory 212 is decreased.

It is determined if the fill level is decreasing because if fill level is above the desired fill level and the fill level is decreasing, then it may not be necessary to increase the frequency. By increasing the frequency, more packets are read out of FIFO 206 and the fill level in buffer memory 212 may decrease. Accordingly, undershoots are avoided where the frequency is continually increased until it is too high to maintain the fill level at a desired fill level.

In step 1010, if the fill level is decreasing, the frequency is kept the same. The process then reiterates to step 1002 where the average fill level during a period of time is determined, and the frequency is continually adjusted.

If the fill level is not too high, in step 1012, it is determined that the fill level is increasing. It is determined if the fill level is increasing because if fill level is below the desired fill level and the fill level is increasing, then it may not be necessary to decrease the frequency. By decreasing the frequency, fewer packets are read out of FIFO 206 and the fill level in buffer memory 212 may increase. Accordingly, overshoots are avoided where the frequency is continually decreased until it is too low to maintain the fill level at a desired fill level.

If the fill level is not increasing, in step 1014, the frequency is decreased. Because the fill level is below the desired fill level and the fill level is not increasing, then the frequency is decreased. Accordingly, fewer packets are outputted by FIFO 206 and thus fewer packets are read from buffer memory 212. Accordingly, the fill level of buffer memory 212 may increase.

In step 1016, if the fill level is increasing, then the frequency is kept the same. If the fill level is below the desired fill level, but is increasing, then it is assumed that the fill level may keep increasing if the clock frequency remains the same. Accordingly, overshoots are avoided.

The following represents an example of code that implements the method depicted in FIG. 10 according to one embodiment of the present invention.

process is in the steady state phase, the buffer memory fill level should remain around the desired level and no buffer overflows or underruns should occur. A network outage is detected/declared when buffer overflow or underrun occurs. As a result of this event, frequency generator controller 210 goes back to step 502 (course sweeping frequency step) of FIG. 5 in order to relock to the sender frequency. This mechanism also covers the case when sender node 102 changes the sender clock in which the serial bitstream is transmitted.

The present invention can be implemented in the form of control logic in software or hardware or a combination of both. The control logic may be stored in an information storage medium as a plurality of instructions adapted to direct an information processing device to perform a set of steps. Based on the disclosure and teachings provided herein, a person of ordinary skill in the art will appreciate other ways and/or methods to implement the present invention.

The above description is illustrative but not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

```
////////////////////////////////////////////////////
//detect the trend of the buffer fill level for autobaud steady state:
//check the trend (i.e. derivative of fill level):
if (!auto_freq_locked66) begin
    //make sure 'FillLevelTrendOK' is FALSE before we enter steady state:
    FillLevelIncreased    <= #1 1'b0;
    FillLevelIncreased1   <= #1 1'b1;
    FillLevelIncreased2   <= #1 1'b0;
    FillLevelIncreased3   <= #1 1'b1;
end else if(increasedBy3 || decreasedBy3) begin
    //keep history of the fill level to detect the trend of the fill level. If
    //the fill level is above the "desired" fill level, but the trend is such that
    //the fill level is decreasing (i.e. going n the right direction), then
    //we stop increasing the frequency to avoid large undershoot. Since the trend is OK,
    //the fill level will eventually get there. This scheme lengthens the time it takes
    //to get to the right frequency at steady state, but once we get there, it will have
    //a very good long term stability
    increasedBy3          <= #1 1'b0;
    decreasedBy3          <= #1 1'b0;
    PrevPktCount          <= #1 CapturedPktCount;
    FillLevelIncreased    <= #1 increasedBy3;
    FillLevelIncreased1   <= #1 FillLevelIncreased;
    FillLevelIncreased2   <= #1 FillLevelincreased1;
    FillLevelIncreased3   <= #1 FillLevelIncreased2;
end else begin
    //we detect a real change in the fill level (a change of 1 is not a real change, since
    //it can be caused by the non-synchronized writing and reading of the buffer memory)
    increasedBy3          <= #1 (CapturedPktCount > (PrevPktCount + 2));
    decreasedBy3          <= #1 (CapturedPktCount < (PrevPktCount - 2));
end
FillLevelTrendOK          <= #1 ((!FillLevelTooHigh && FillLevelIncreased1 && FillLevelIncreased2)
                                 || (FillLevelTooHigh && !FillLevelincreased1 && !FillLevelIncreased2));
//end trend detection
////////////////////////////////////////////////////
```

In one embodiment, the autobaud process assumes a reasonably low PDV and a reasonably low packet loss through a packet switch network 104. Large PDV or packet loss may degrade the performance of the autobaud process and result in a longer time to lock to the sender's frequency. A network outage (i.e., persistent packet loss) may result in restarting the autobaud process. As long as the autobaud

What is claimed is:

1. A receiver for recovering a serial clock of a transmitter used in sending packets from the transmitter, wherein packet delay in sending the packets from the transmitter to the receiver occurs, the receiver comprising:

a buffer configured to store packets received from the transmitter;

a controller configured to determine a fill level of the buffer;

a frequency generator configured to generate a clock frequency, the clock frequency used to determine when to read packets from the buffer;

a frequency controller configured to instantaneously adjust the clock frequency of the frequency generator based on an algorithm that determines the clock frequency based on the fill level of the buffer.

2. The receiver of claim 1, wherein the frequency controller is configured to adjust the frequency based on an adaptive timing algorithm.

3. The receiver of claim 1, wherein the frequency controller is configured to adjust the frequency based on an autobaud algorithm.

4. The receiver of claim 1, wherein the frequency controller is configured to adjust the frequency to keep the fill level at the buffer at a desired level.

5. The receiver of claim 4, wherein the frequency controller causes the frequency generator to lower the frequency if the fill level is below the desired fill level.

6. The receiver of claim 1, wherein the frequency controller causes the frequency generator to increase the frequency if the fill level is above the desired fill level.

7. The receiver of claim 1, further comprising a FIFO configured to receive packets from the buffer.

8. The receiver of claim 7, wherein the controller is configured to read a packet from the buffer when the packet can be written to the FIFO.

9. The receiver of claim 7, wherein data from a packet is read from the FIFO at each clock cycle of the clock frequency.

10. The receiver of claim 7, further comprising a parallel to serial converter configured to receive the packet from the FIFO and output the packet in a serial bitstream.

11. A method for determining a clock frequency of a transmitter used in sending packets from the transmitter, wherein packet delay in sending the packets from the transmitter to the receiver occurs, the method comprising:

receiving a plurality of packets at the receiver;

storing the plurality of packets in a buffer;

monitoring a fill level of the buffer for a time period;

providing a counter;

during the time period, incrementing or decrementing a counter based on the fill level of the buffer;

at an end of the time period, determining if a frequency of the recovered serial clock should be increased or decreased based on a most significant bit (MSB) of the counter, wherein the counter is configured such that the MSB can be examined to determine if the frequency should be increased or decreased; and increasing or decreasing the clock frequency of a clock based on the determination.

12. The method of claim 11, wherein if the MSB is one, then determining that the clock frequency should be decreased.

13. The method of claim 12, wherein if the MSB is zero, then determining that the clock frequency should be increased.

14. The method of claim 11, wherein monitoring the fill level comprising measuring the fill level of the buffer at every clock cycle of the clock frequency.

15. The method of claim 11, wherein if the fill level is greater than a desired fill level, incrementing the counter.

16. The method of claim 11, if the fill level is less than a desired fill level, decrementing the counter.

17. A method for recovering a serial clock of a transmitter for packets sent from the transmitter, wherein packet delay sending the packets from the transmitter to the receiver occurs, the method comprising:

receiving a plurality of packets at the receiver;

storing the plurality of packets in a buffer;

determining a first clock frequency based on a coarse tuning method;

determining a second clock frequency using the first clock frequency based on a fine tuning method;

adjusting a buffer fill level to a desired fill level by varying the second clock frequency; and maintaining the desired buffer fill level by adjusting the second clock frequency.

18. The method of claim 17, wherein determining the coarse tuning method comprises:

(a) determining a low frequency;

(b) counting a first number of packets written to the buffer during a time period;

(c) counting a second number of packets read from the buffer during the time period; and (d) using the first number of packets and the second number of packets to determine whether to increase the frequency.

19. The method of claim 18, wherein if the second number is greater than the first number, recording a current clock frequency.

20. The method of claim 18, wherein if the second number is less than the first number, increasing the clock frequency and performing steps (a)–(d).

21. The method of claim 17, wherein the fine tuning method comprises:

performing a sweep down method to determine a sweep down clock frequency;

performing a sweep up method to determine a sweep up clock frequency; and determining the second frequency based on the sweep down clock frequency and the sweep up clock frequency.

22. The method of claim 21, wherein the sweep down method comprises:

(a) counting a first number of packets written to the buffer during a time period;

(b) counting a second number of packets read from the buffer during the time period; and (c) if the second number is greater than the first number, incrementing a trend down counter.

23. The method of claim 22, wherein the sweep down method comprises:

(d) if the second number is less than the first number, incrementing a trend up counter; and (e) determining if the trend up and trend down counters are equal to a max trend number;

(f) if the trend up and trend down counters are equal to the max trend number, then recording a current frequency as a sweep down frequency.

24. The method of claim 23, wherein if the second number is less than the first number and the trend up and trend down counter are not equal to the max trend number, then incrementing the clock frequency and performing steps (a)–(f).

25. The method of claim 23, wherein if the second number is greater than the first number and the trend up and trend down counter are not equal to the max trend number, then decrementing the clock frequency and performing steps (a)–(f).

26. The method of claim 25, wherein maintaining the desired buffer fill level comprises:

determining an average fill level of the buffer during a period of time;
  determining if the average fill level is lower than the desired fill level;
  if the average fill level is lower, determining if the average fill level for multiple periods of time is increasing;
  if the average fill level for multiple periods of time is increasing, keeping the second clock frequency at a same level; and
  if the average fill level for multiple periods of time is not increasing, decreasing the second clock frequency.

27. The method of claim 21, wherein the sweep up method comprises:
  (a) counting a first number of packets written to the buffer during a time period;
  (b) counting a second number of packets read from the buffer during the time period; and
  (c) if the second number is greater than the first number, incrementing a trend down counter.

28. The method of claim 27, wherein the sweep down method comprises:
  (d) if the second number is less than the first number, incrementing a trend up counter; and
  (e) determining if the trend up and trend down counters are equal to a max trend number;
  (f) if the trend up and trend down counters are equal to the max trend number, then recording a current frequency as a sweep down frequency.

29. The method of claim 28, wherein if the second number is less than the first number and the trend up and trend down counter are not equal to the max trend number, then incrementing the clock frequency and performing steps (a)–(f).

30. The method of claim 29, wherein if the second number is greater than the first number and the trend up and trend down counter are not equal to the max trend number, then decrementing the clock frequency and performing steps (a)–(f).

31. The method of claim 17, wherein adjusting the buffer fill level comprises:
  comparing the buffer fill level with the desired fill level of the buffer;
  offsetting the clock frequency to drain or fill the buffer based on the comparison.

32. The method of claim 31, wherein if the buffer fill level is greater than the desired fill level, increasing the clock frequency.

33. The method of claim 31, wherein if the buffer fill level is less than the desired fill level, decreasing the clock frequency.

34. The method of claim 17, wherein maintaining the desired buffer fill level comprises:
  determining an average fill level of the buffer during a period of time;
  determining if the average fill level is higher than the desired fill level;
  if the average fill level is higher, determining if the average fill level for multiple periods of time is decreasing;
  if the average fill level for multiple periods of time is decreasing, keeping the second clock frequency at a same level; and
  if the average fill level for multiple periods of time is not decreasing, increasing the second clock frequency.

35. A method for recovering a serial clock of a transmitter for packets sent from the transmitter, wherein packet delay in sending the packets from the transmitter to the receiver occurs, the method comprising:
  (a) changing a clock frequency in a first direction;
  (b) changing the clock frequency in the first direction until a first trend for packets being written and read from a buffer changes to a second trend;
  (c) when the first trend changes to the second trend, changing the clock frequency in a second direction until the second trend changes to the first trend for packets being written and read from the buffer changes; and
  (d) repeating steps (a)–(d) until a certain number of changes in the first and second direction are made.

36. The method of claim 35, wherein the first direction is down and the second direction is up.

37. The method of claim 35, wherein when the first trend changes to the second trend comprises when less packets are read from the buffer than written.

38. The method of claim 35, further comprising incrementing a trend up counter when the clock frequency is changed in the first direction and incrementing a trend down counter when the frequency is changed in the second direction, wherein the certain number of changes in the first and second direction is when the trend up and trend down counters are equal to a certain number.

39. The method of claim 35, further comprising recording the clock frequency after the certain number of changes are made.

40. The method of claim 35, wherein the first direction is up and the second direction is down.

41. The method of claim 35, wherein when the first trend changes to the second trend comprises when more packets are read from the buffer than written.

42. A method for adjusting a fill level of a buffer after determining a clock frequency of a transmitter used in sending packets from the transmitter, wherein packet delay in sending the packets from the transmitter to the receiver occurs, the method comprising:
  (a) determining a desired fill level;
  (b) receiving a plurality of packets at the receiver;
  (c) storing the plurality of packets in a buffer;
  (d) determining a fill level of the buffer for a time period;
  (e) determining if the fill level is greater than or less than the desired fill level;
  (f) if the fill level is greater than the desired fill level, determining a trend for prior changes in the fill level for prior time periods;
  (g) if the prior changes indicate than the fill level has been decreasing, performing steps (a)–(k) without changing the clock frequency;
  (h) if the prior changes indicate than the fill level has been increasing, increasing the clock frequency and performing steps (a)–(k) without changing the clock frequency;
  (i) if the fill level is less than the desired fill level, determining a trend for prior changes in the fill level for prior time periods;
  (j) if the prior changes indicate than the fill level has been increasing, performing steps (a)–(k) without changing the clock frequency;
  (k) if the prior changes indicate than the fill level has been decreasing, decreasing the clock frequency and performing steps (a)–(k).

* * * * *